(12) United States Patent
Rahmstorf et al.

(10) Patent No.: US 6,305,733 B1
(45) Date of Patent: Oct. 23, 2001

(54) COCKPIT FOR AN AUTOMOTIVE VEHICLE

(75) Inventors: Peter Rahmstorf, Saint-Laurent-Du-Pont; Lydia Creutz, Ingwiller, both of (FR)

(73) Assignee: Sai Automotive Allibert Industrie, Nanterre (FR)

( * ) Notice: Subject to any disclaimer, the term of this patent is extended or adjusted under 35 U.S.C. 154(b) by 0 days.

(21) Appl. No.: 09/597,613

(22) Filed: Jun. 20, 2000

(30) Foreign Application Priority Data

Jun. 23, 1999 (FR) .................................................. 99 08038

(51) Int. Cl.[7] .................................................. B62D 25/14
(52) U.S. Cl. .............................. 296/70; 296/72; 296/188; 296/208; 180/90
(58) Field of Search ....................... 296/192, 194, 296/191, 208, 29, 30, 188, 70, 72; 180/90

(56) References Cited

U.S. PATENT DOCUMENTS

| | | | |
|---|---|---|---|
| 4,223,754 | * 9/1980 | Mizuno et al. ........................ | 180/90 |
| 4,733,739 | 3/1988 | Lorenz et al. ........................ | 180/90 |
| 4,750,780 | 6/1988 | Harasaki et al. ..................... | 296/192 |
| 5,088,571 | 2/1992 | Burry et al. .......................... | 180/90 |
| 5,273,310 | * 12/1993 | Terai .................................... | 296/70 X |
| 5,311,960 | 5/1994 | Kukainis et al. ..................... | 180/90 |
| 5,387,023 | * 2/1995 | Deneau .................................. | 296/72 |
| 5,556,153 | 9/1996 | Kelman et al. ....................... | 296/70 |
| 5,564,769 | * 10/1996 | Deneau et al. ........................ | 296/72 |
| 5,678,877 | 10/1997 | Nishijima et al. .................... | 296/70 |
| 5,685,595 | 11/1997 | Nishijima et al. .................... | 296/70 |
| 5,707,100 | * 1/1998 | Suyama et al. ....................... | 296/192 |
| 5,709,601 | * 1/1998 | Heck ..................................... | 296/70 X |
| 5,735,543 | * 4/1998 | Koppenstein et al. ............. | 180/90 X |
| 5,979,540 | * 11/1999 | Allison et al. ................... | 296/208 X |
| 5,992,925 | * 11/1999 | Alberici .............................. | 296/72 X |
| 6,068,295 | * 5/2000 | Skabrond et al. ................ | 180/90 X |
| 6,073,987 | * 6/2000 | Lindberg et al. ...................... | 296/70 |
| 6,110,037 | * 8/2000 | Yoshinaka .......................... | 296/70 X |
| 6,186,887 | * 2/2001 | Dauvergne ....................... | 296/208 X |

FOREIGN PATENT DOCUMENTS

| | | |
|---|---|---|
| 1962644 | 1/1998 | (DE) . |
| 0185856 | 7/1986 | (EP) . |
| 0515287 | 5/1992 | (EP) . |
| 0827894 | 8/1997 | (EP) . |
| 9849024 | 11/1998 | (WO) . |
| 9926833 | 6/1999 | (WO) . |

* cited by examiner

Primary Examiner—Stephen T. Gordon
Assistant Examiner—Lori L Coletta
(74) Attorney, Agent, or Firm—Rothwell, Figg, Ernst & Manbeck

(57) ABSTRACT

The invention is related to a dashboard cockpit for an automotive vehicle comprising a hollow beam as a reinforcing means, transverse to move direction of the vehicle; said beam including a air duct. Preferably, this cockpit comprises moreover a upper support-plate having a first upper portion of longitudinal duct, and on the other hand, a lower support-plate having a second lower portion of longitudinal duct. The first and second portions of duct being adapted to be arranged facing one the other and connecting together for defining a longitudinal duct.

10 Claims, 9 Drawing Sheets

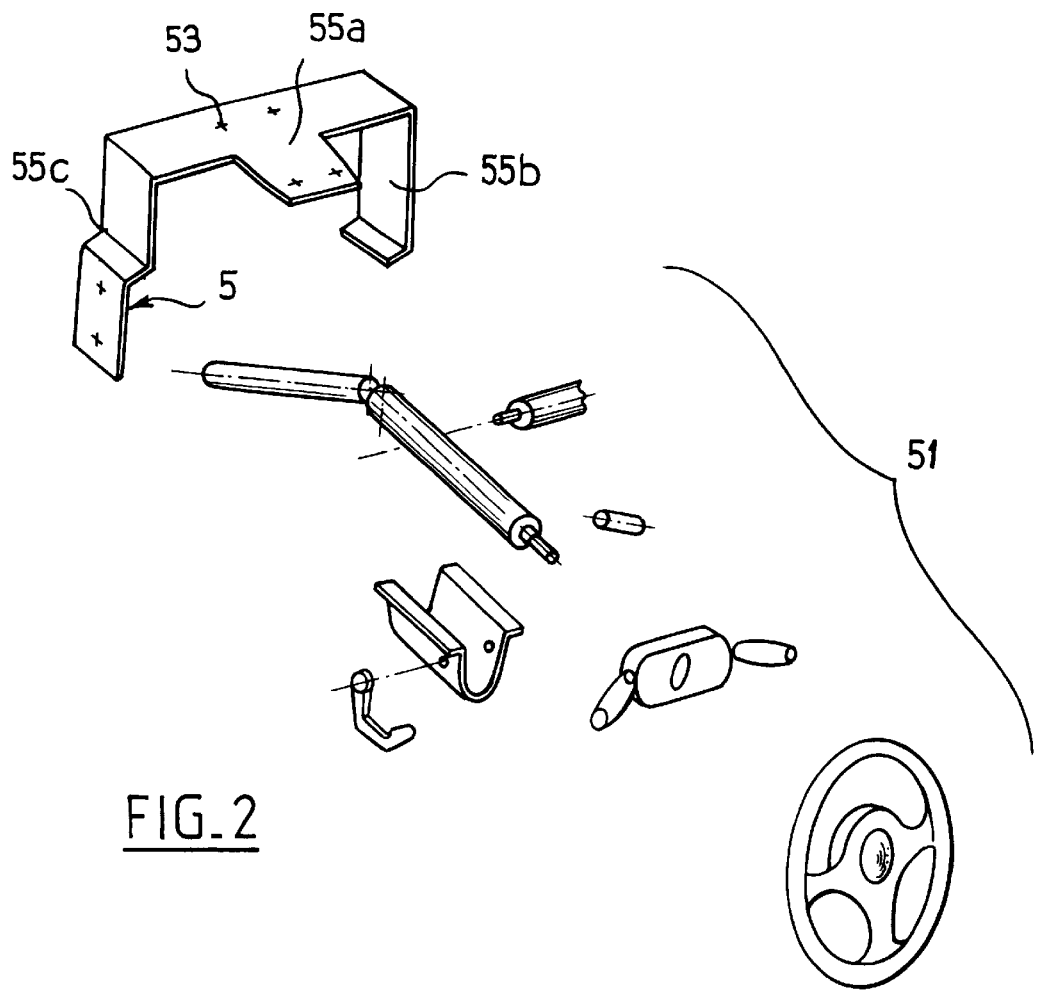
FIG_2
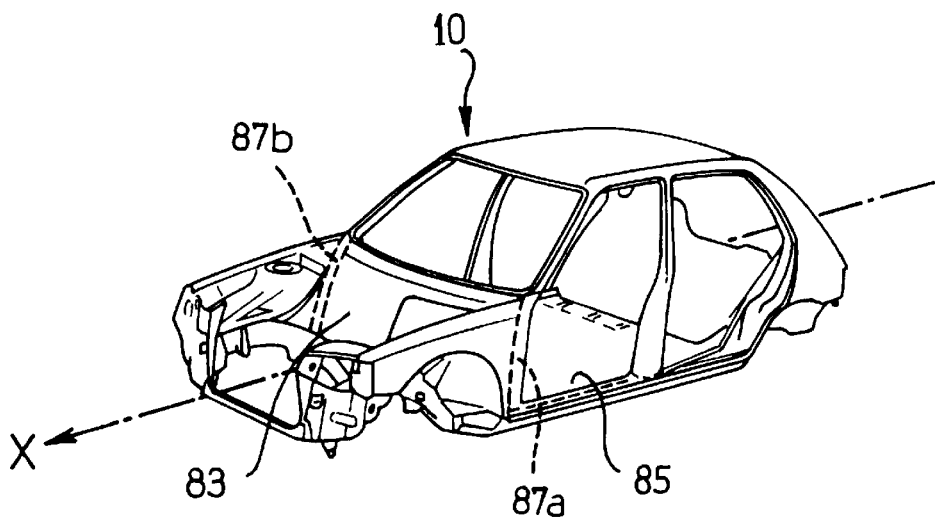
FIG_5

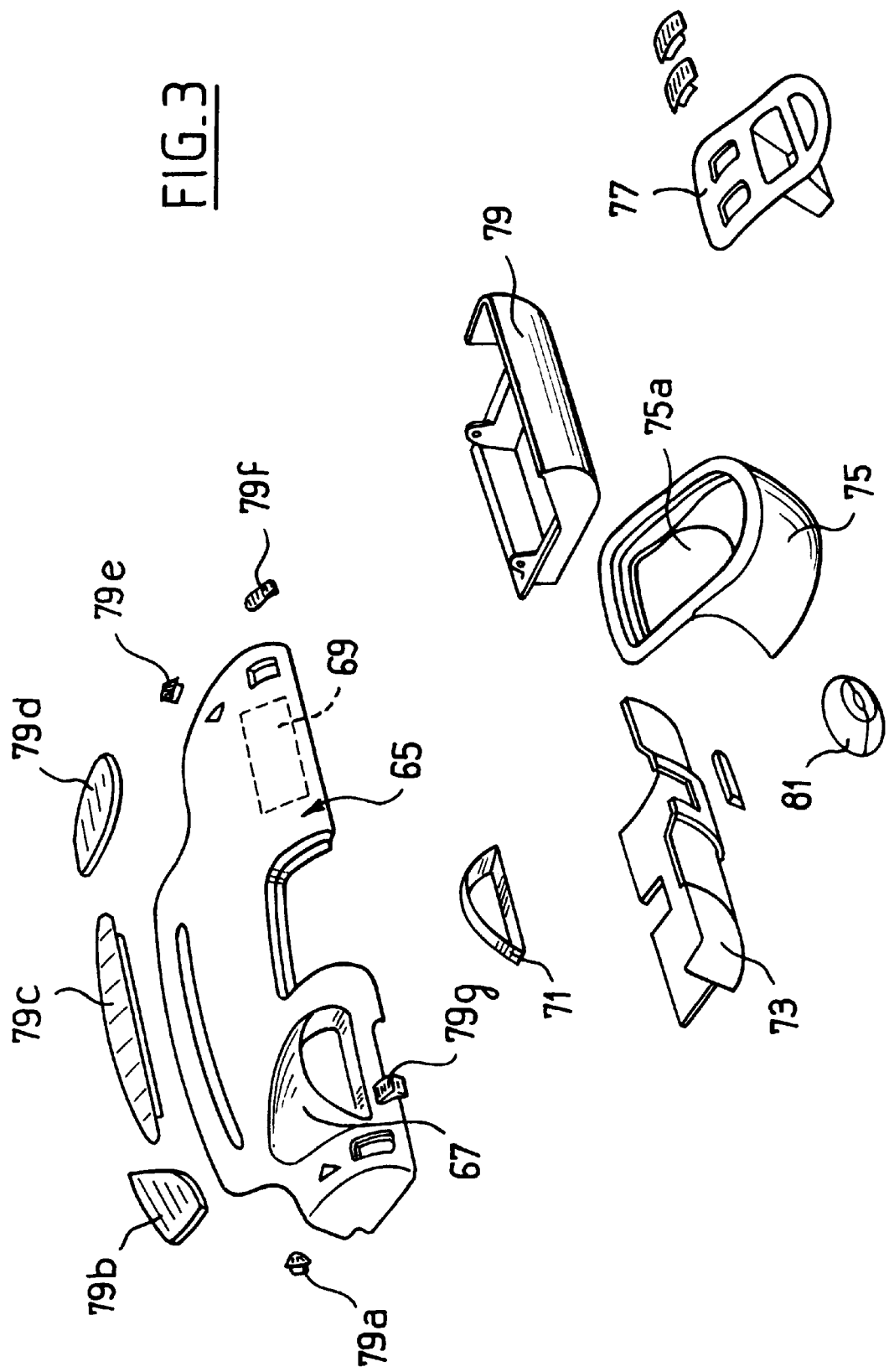

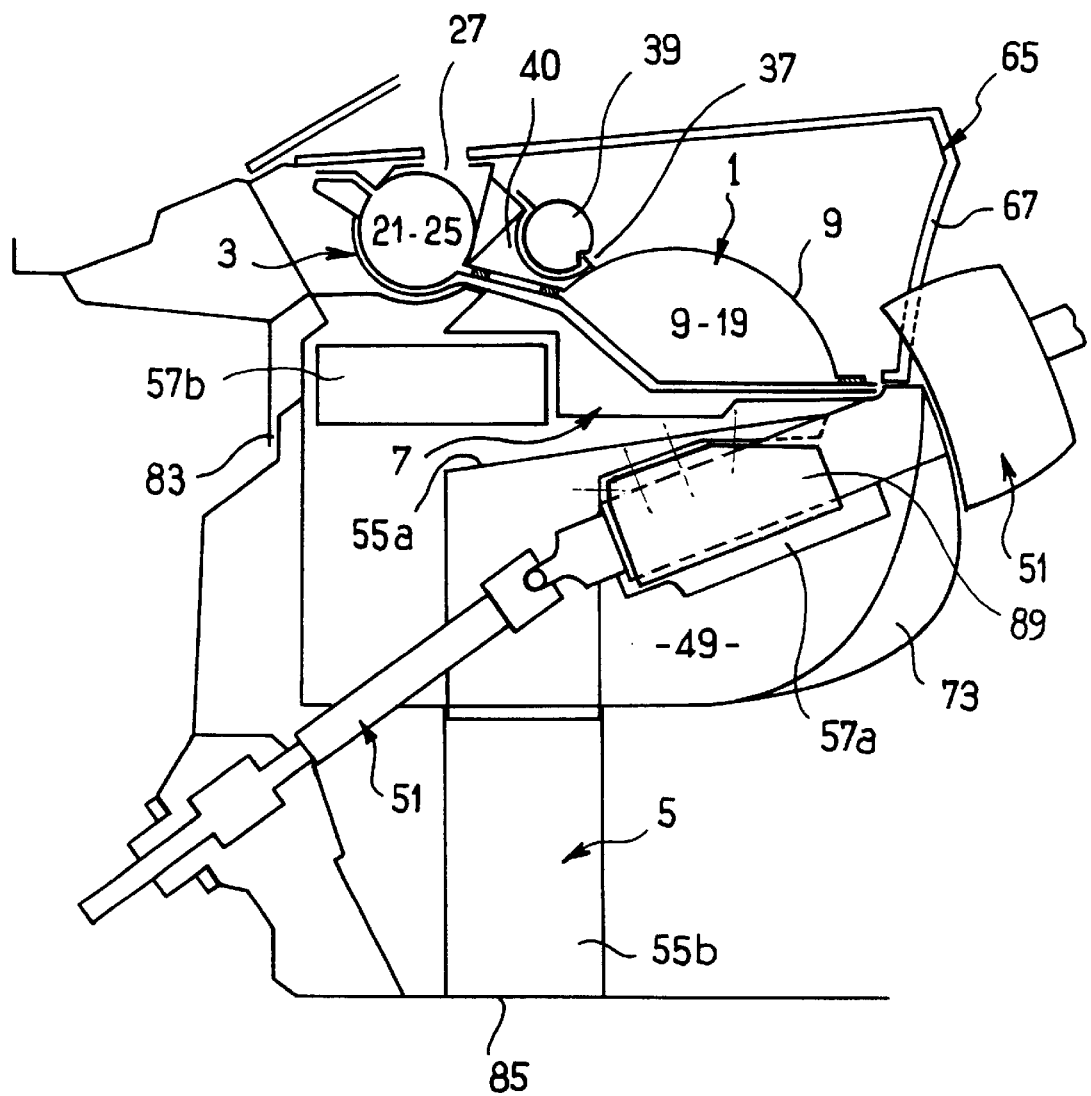
FIG_4

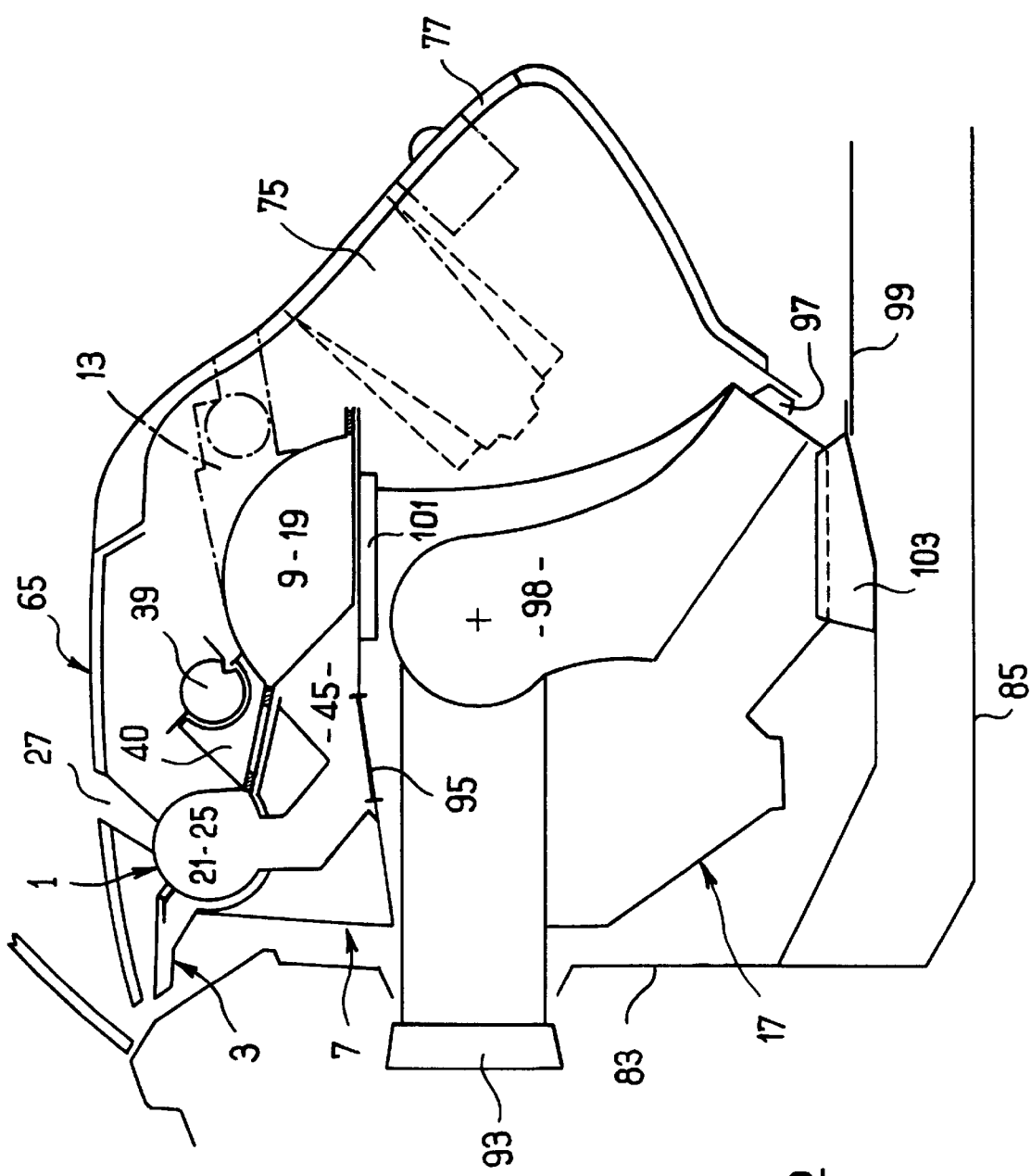
FIG._6

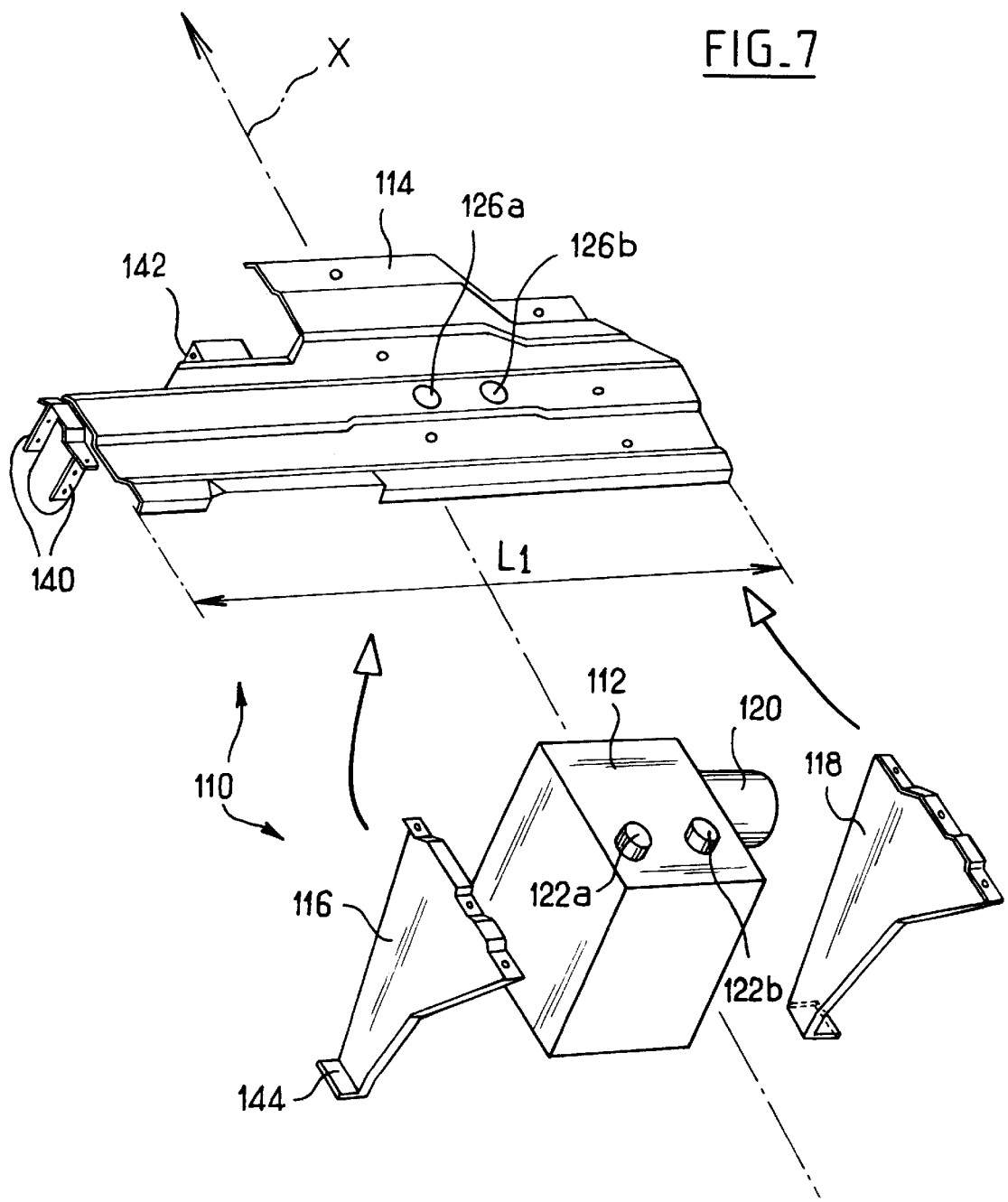
FIG_7

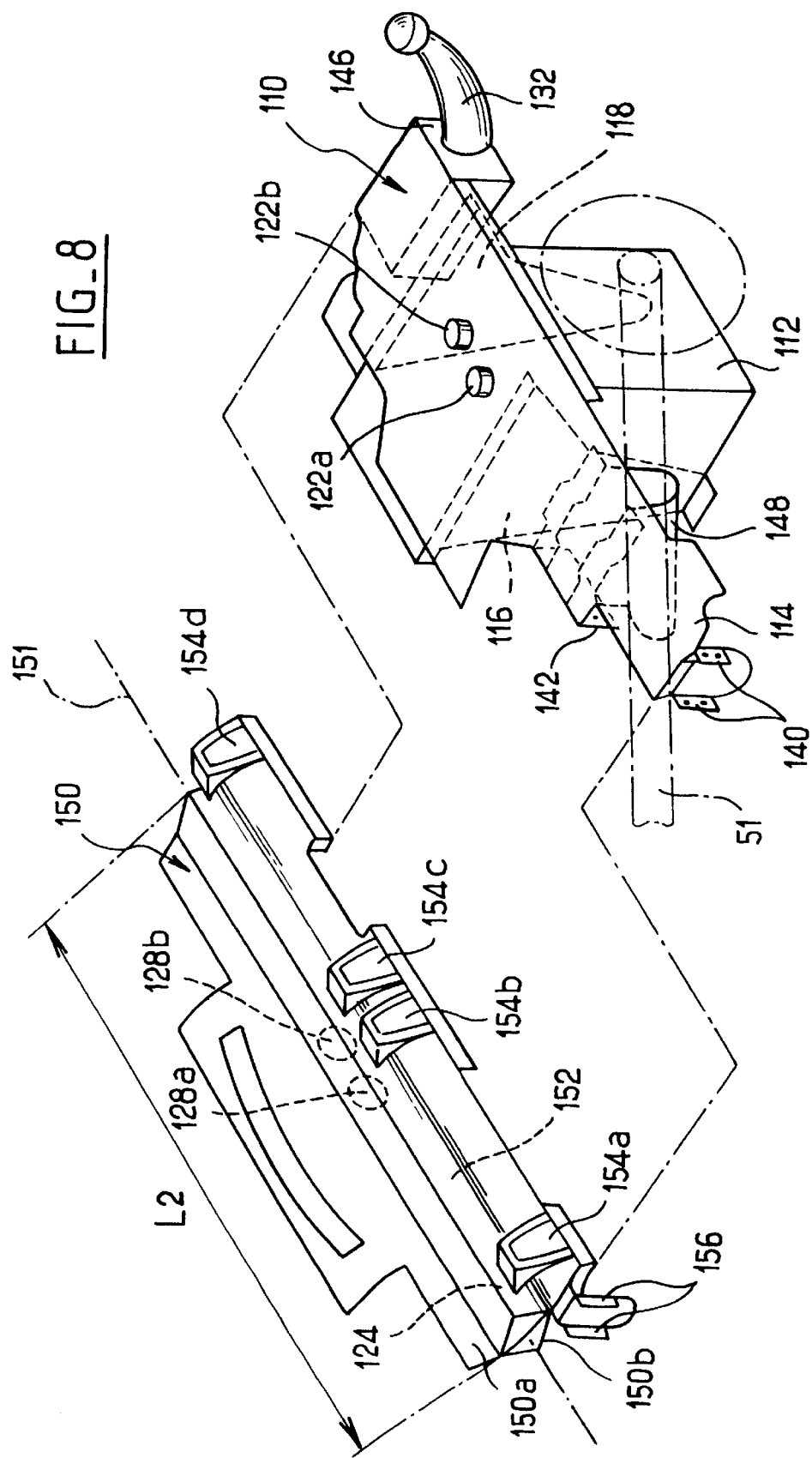
FIG_8

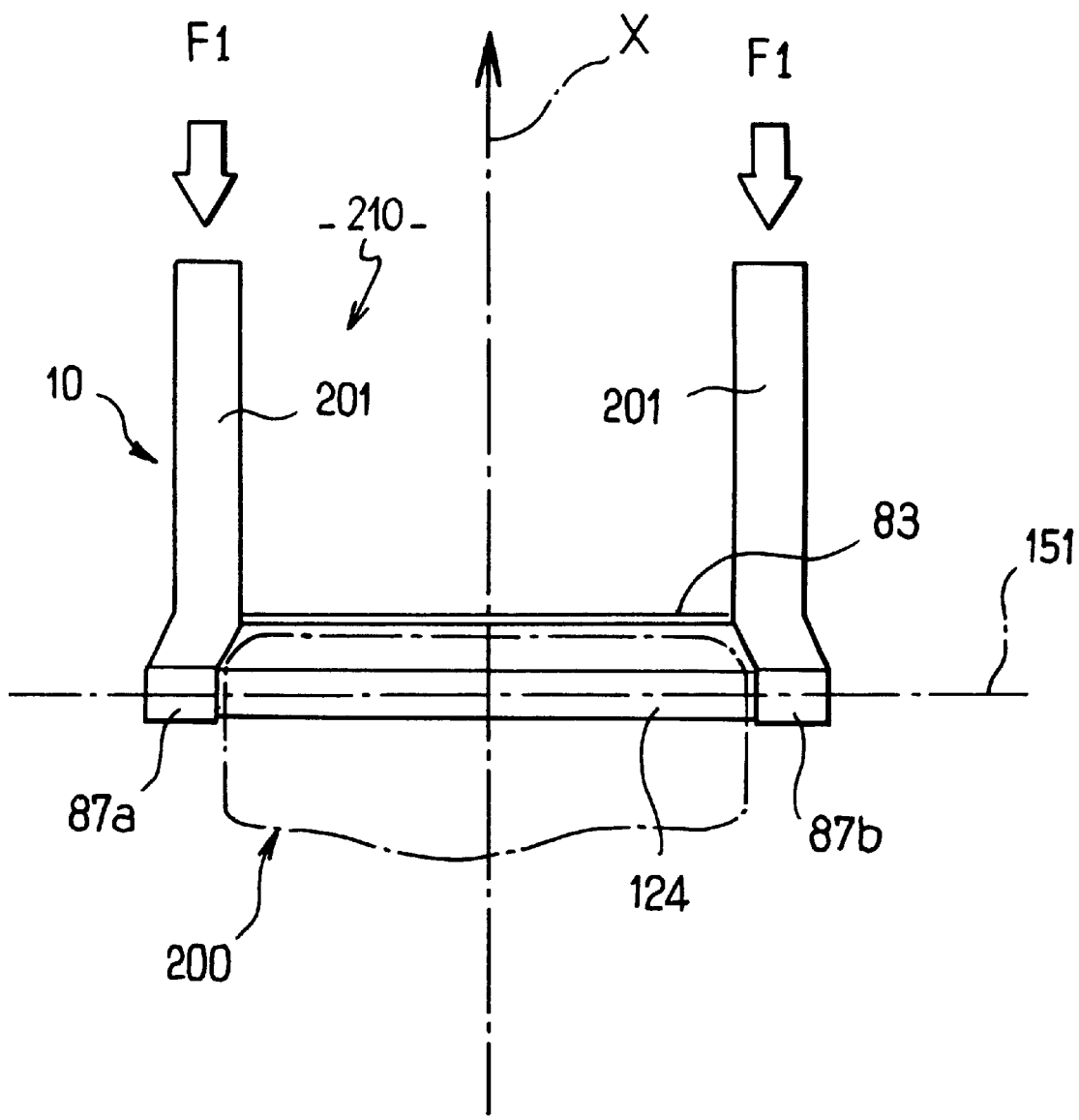

COCKPIT FOR AN AUTOMOTIVE VEHICLE

BACKGROUND OF THE INVENTION

1. Field of the Invention

The invention is related to a dashboard cockpit of an automotive vehicle comprising a structural body including "A" pillars.

2. Description of the Related Art

In the concerned field, such a cockpit having a main direction and a length along said main direction is already known, the main direction crossing two lateral sides of the cockpit which are adapted to be located near said "A" pillars of the vehicle. Typically, such a cockpit is adapted to withstand a determined maximum force, and comprises:

fixation means for fixing the cockpit to the structural body of the vehicle and for transferring from one to the other, at least a part of the maximum force, transversal reinforcing means extending substantially along the main direction.

EP-B-0 185 856 describes such a cockpit.

SUMMARY OF THE INVENTION

One of the aims of the invention is to provide for a synergy between some parts of such a cockpit, by avoiding the increase in the number of said parts and by conceiving these ones as multi-functional parts; in this way both a standardization of cockpits and an optimization of at least some Of the functions of the parts are allowed.

In this aim, a characteristic of the invention provides that the transversal reinforcing means comprise a sole hollow cross beam which extends substantially along the main direction, on at least a main portion of said length, and which defines an air duct and is therefore connected to input means for air and to output means for air (directed towards the vehicle); a mechanical resistance allows said hollow cross beam to substantially withstand (all) the maximum force the cockpit must withstand.

As a consequence, a main portion of the cockpit will have both a function of structural withstanding and a function of optimalized air "distribution". In this way, compared with usual solutions, this allows to substantially reduce length of air pipes and therefore loss of charge.

According to another characteristic of the invention, both the hollow cross beam (which defines the air duct) and the input means for air and the output means for air, are preferably integrated to a molded structural member, which is essentially made of plastic material, is substantially plate-shaped and is provided with at least some of the fixation means; said structural member being covered with a decorative covering connected thereto. The decorative covering is typically less mechanically shockproof than the structural member.

For fulfilling requirements not easily compatible related to costs, mass production, easiness of manufacturing, reliability and adaptability to various types of vehicles ("monospace", saloon car, two-door sedan, . . . ) having different styles and therefore different dashboard conformations, the invention recommends that the cockpit comprises:

a first plate extending substantially in an horizontal plane and having a length along said main directions the first plate integrating a first upper portion of duct, open downwards and extending substantially along this direction, a second plate extending substantially in an horizontal plane and having a length along the main direction, the second plate integrating a second lower portion of duct, open upwards, and extending substantially along this direction, the first and second plates being connected together in order to define said air circulation duct.

Typically, in an automotive vehicle, vibrations and their transmission are an important problem.

The invention brings a solution to this problem consisting in providing a cockpit comprising an antivibration structure including a bracket to which is connected one of a steering column and a gear lever, for absorbing vibrations (alike to be) transmitted in (or towards) the column or the lever; the antivibration structure comprising at least two fixation areas located apart from each other for defining two connections with the structural body of the vehicle.

The invention describes advantageously this "antivibration structure" so as to have a structure alike to be fitted easily to cockpits intended to different vehicles, to fulfill requirements dictated by these different vehicles and to comply with constraints of reliability and costs in the concerned field; such a structure supplying its "antivibration" function with a mastered efficiency.

As a consequence, another characteristic of the invention recommends that the antivibration structure comprises:

one of an antivibration plate and a bar, extending substantially along the main direction of cockpit, in lower area of the cockpit, and to which is connected the steering column or the gear lever, for transmission of vibrations, and at least a stem standing under the structure, the stem being connected to connection means for connecting it to the floor of the vehicle, in order to transmit said vibrations towards the floor.

For the above-mentioned considerations, and in order to optimize the efficiency-costs ratio of the antivibration structure, another characteristic of the invention recommends that the antivibration structure extends from the lateral side of the cockpit which is the nearest to the steering column, to beyond the location area of the steering column, but only on a portion of the length of the cockpit.

Typically, in a vehicle, a heating and/or ventilating unit (which may include an air conditioning function) forms a rather voluminous block which is securely fastened to the structural body of the vehicle.

The invention proposes to take advantage of such a unit for connecting the cockpit to the structural body of the vehicle.

So according to another feature of the invention, the cockpit is preferably connected to heating and ventilating unit, through the antivibration structure, the heating and ventilating unit extending under the antivibration structure and being adapted for generating air at a regulated temperature to the input means for air of said air duct.

As regards said "antivibration structure" a privileged embodiment adapted for matching the above-mentioned double-plate structure and reaching the object of manufacture and effectiveness, as previously identified, consists in providing the antivibration structure with a plate extending substantially in an horizontal plane and having a length along said general direction, the plate being located under the structural member and being connected thereto, as well as to a substantially vertical force strut, at same distance from the lateral sides of the cockpit.

In relation to the connection between the cockpit and the heating and ventilating unit, another feature of the invention recommends that the cockpit further comprises sliding means for slidably connecting the heating and ventilating unit to the cockpit.

Another feature of the invention relates to an automotive vehicle having a longitudinal direction, two lateral sides extending substantially parallel to said longitudinal direction, and comprising:

a structural body including "A" pillars, a cockpit (or dashboard) having a main direction and a length along said main direction, the main direction extending substantially perpendicular to the longitudinal direction of the vehicle and crossing the two lateral sides of the cockpit which are adapted to be located near the "A" pillars of the vehicle, the cockpit being adapted to withstand a determined maximum force, the cockpit comprising:

fixation means for fixing the cockpit to the structural body of the vehicle and for transferring from one to the other at least a part of said determined maximum force, transversal reinforcing means extending substantially along said main direction, the vehicle being designed for withstanding a determined front shock punched along substantially the longitudinal direction of the vehicle and which is transmitted to the cockpit through the structural body of said vehicle, wherein the transversal reinforcing means comprises one hollow cross beam extending substantially in said main direction, on at least a main portion of said length, the hollow cross beam defining an air duct and being therefore connected to input means for air and to output means for air, and wherein said determined maximum force is less than substantially 50% of the force induced by the front shock, the remaining part of said force being essentially withstood by the structural body of the vehicle.

Thus, it will be possible to reduce the "structural extend" of the cockpit, and especially the transversal reinforcing bar it typically includes.

A basic cockpit common with various versions or lines could then be used, said basic cockpit having its "structural functions" within a range including the specifications of the car manufacturers for those various lines of their cars, such as a common structure being ready for withstanding 1500 to 3000 kgs.

From the above, it will be noted that the cockpit as a complete body must be designed for withstanding the above-mentioned "determined maximum force" even if the invention recommends that all said "determined maximum force" be withstood by the hollow cross beam, alone.

It will be also noted that the expression "along the main direction" means "coaxially" or "parallel" to said direction.

BRIEF DESCRIPTION OF THE DRAWINGS

A more detailed description follows, in relation to drawings wherein:

FIG. 2 shows an exploded view of the connection between a direction column and the reinforcing transversal bar connected thereto, FIG. 3 shows in an exploded view the main covering elements provided for covering the structural elements of the cockpit, as illustrated in FIGS. 1 and 2, FIG. 5 is a schematic view showing the structural body of the vehicle, FIGS. 4 and 6 show two sections of the cockpit as assembled, and disposed on a vehicle (sections IV–TV and VI—VI, as shown in figure 1), FIGS. 7, 8 and 9, diagramatically show three successive steps for manufacturing an embodiment of the cockpit of the invention, and FIG. 10, is a simulation showing a shock test (see also FIG. 9).

DETAILED DESCRIPTION OF THE PREFERRED EMBODIMENT

Figure 1:
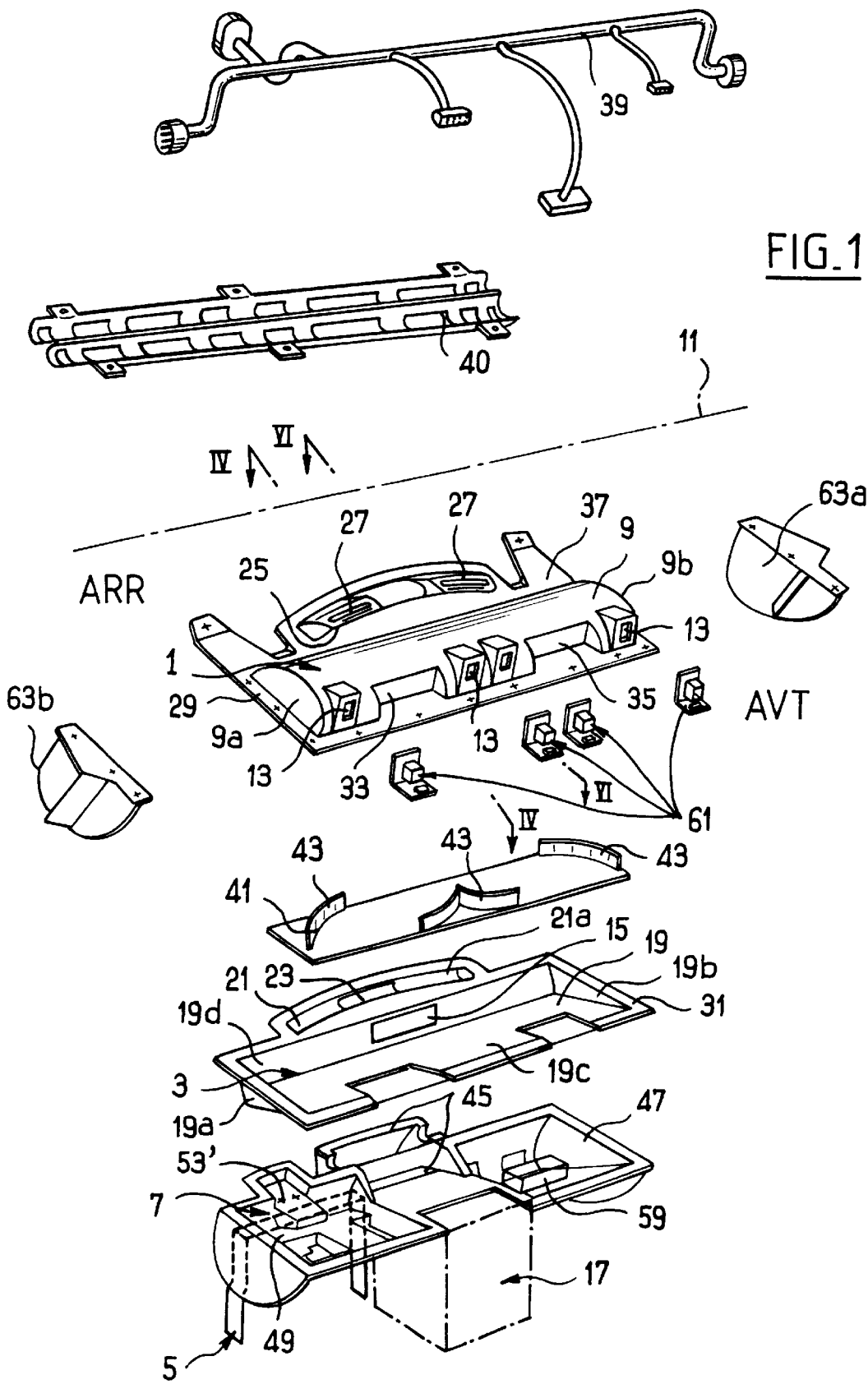
FIG. 1 shows an exploded view of a first part of the elements included in the cockpit of the invention.

Firstly, in FIG. 1 there can be seen the principal structural elements of the cockpit.

They are the upper support block (or support tray) 1, the lower support block (or support tray) 3, complementary to the first, and also the antivibration portal 5.

The upper and lower support blocks 1 and 3 are preferably completed by a third support block 7 to which is fixed the antivibration portal 5 (which, if not, would be fixed to the block 3).

The three blocks are each substantially in the form of a tray. The upper support block 1 incorporates in its shape an upper half-channel (or half-duct)9 open towards the bottom.

The half-channel 9 extends in the principal longitudinal direction 11 (or "main direction") of the block 1. The longitudinal ends of the channel (or duct) 9 are closed by two end walls 9a, 9b. Since the half-channel 9 will constitute, with the lower half-channel 19, an air conduit (or duct) for the heating/cooling of the passenger compartment of the vehicle for which the cockpit is intended, the upper half-channel 9 incorporates ventilation outlets (frontal in the present instance) 13, while the lower half-channel 19 has at least one air inlet aperture, such as 15, adapted to communicate with the heating and ventilation unit shown diagrammatically at 17 (see also FIG. 6). Lateral end walls 19a, 19b close the channel 19 of the block 3, the bottom of which, it will be noted, consists of a wall 19c inclined downwards from the front (AVT) towards the rear (ARR), where an upright wall 19d, incorporates the air entry 15.

Further still to the rear, the block 3 incorporates a second half-channel 21, the upright rear wall 21a of which includes an entry 23 for the air for de-misting the windscreen.

The half-channel 21 is complementary to another half-channel 25 formed longitudinally (parallel to the axis 11) along the rear of the upper block 1.

In the (upper) wall of the upper half-channel 25, one or more de-misting air outlet apertures are provided, such as 27.

The two blocks 1, 3 are connected to one another peripherally, after having been produced separately.

If they are made of plastics material (polypropylene, for example, fibre-reinforced if required), they may be welded together at the location of their peripheral flanges 29, 31.

At the front, between the front ventilators 13, the outer surface of the half-channel 9 incorporates open cavities at 33, 35, respectively for housing the speedometer and the air-bag housing (not shown).

Between the two longitudinal bulges of the half-channels 9, 25, the block 1 has a longitudinal upper outer channel open towards the top 37, extending parallel to the axis 11, and in which it will be possible to arrange electrical cables, such as the central portion of the bundle 39.

For the quality of the flow of air in the main air circulation channel 9, 19, it is advised to interpose internally a horizontal plate 41 including deflectors such as 43.

Between the unit 17, also termed "heating unit 17", and in particular the air inlet 1,5 into the distribution channel 9–19, provision may be made to interpose an air diffusion/distribution housing, such as 45, integral with the third lower block 7, or fixed to it internally.

The air diffusion housing 45 constitutes an interface area which is located in the central portion (towards the rear) of the block 7, so as to feed the inlet apertures 15 and 23.

On each side of the interface housing 45, the lower block 7 comprises, parallel to the general longitudinal axis 11 (common to the three blocks), two hollow spaces, open towards the top, respectively 47 and 49.

It is assumed that the cockpit illustrated is intended for a vehicle having left-hand drive.

Thus, the left-hand cavity 49 incorporates an area for the passage and fixing of the steering column indicated as a whole by 51 in FIG. 2.

At this location, the steering column is arranged to be fixed to the antivibration bar 5, through anchorage points 53. The bar 5 is further fixed at 53' to the block 7 (FIG. 1).

The purpose of the antivibration bar 5 is to provide a fixing area for the steering column, while constituting a damper (or absorber) for vibrations, which are then damped (or absorbed) in the surrounding areas, by diffusion.

It will have been noted that the antivibration bar 5 has an upper beam (or bar) 55a, extending parallel to the axis 11. It is further extended laterally by two substantially vertical legs (or stems) 55b, 55c, preferably adapted to be fixed to the metal structure (or structural body) of the vehicle, such as, in particular, the floor of the chassis of the vehicle.

An alternative may consist in fixing the transverse bar 5 to the bodywork, to one of the "A" pillars and to the tunnel of said chassis.

The bar 5 may be a metallic part (sheet steel, magnesium, etc.) or a molded hybrid part (plastics/metal).

Inside the cavity 49, where the steering column passes, it is possible in particular to provide for different electronic housings, or electrical components of use in the operation of the vehicle, to be accommodated.

In the cavity 47 there may in particular be accommodated a device for protecting the knees, such as a cushioning housing 59.

Ventilators 61 (to be arranged facing the apertures 13) complete the assembly which has just been described, and lateral flanges 63a, 63b may be provided for fixing to the "A" pillars of the vehicle the blocks 1, 3, 7, assembled to one another. FIG. 3 illustrates the principal trim elements of the structural assembly 1, 3, 7.

It can thus be understood that the upper cover (or covering) 65 will cover the upper block 1, being fixed to it by any appropriate means (screwing, in particular). It may be a one-piece part, for example made of polypropylene. It is typically much less mechanically resistant than the trays 1, 3, and may consist of an outer skin lined on the inside with a layer of foam. It may be produced especially by injection molding, thermoforming or foaming. On the cover 65 there can be seen at 67 the visor area (which should face the area 33 of the speedometer in FIG. 1), and also a hidden location at 69 for the production of an air-bag area, to be arranged opposite the area 35 for receiving the air-bag module.

At 71 there is to be found the visor of the instrument panel, at 73 the lower trim of the dashboard, on the driver's side (to be arranged beneath the left-hand portion of the lower block 7: space 49 and underside of the steering column). At 75, there is shown diagrammatically a central console, to be fitted over the central portion of the cockpit and opposite the heating/ air conditioning unit 17. At 77 there is shown diagrammatically the "double DIN" support panel which will trim the open front space 75a of the console 75 and will be used especially for receiving the control members of the heating unit 17, as well as any switches of use in the operation of the vehicle. The glove compartment is shown diagrammatically at 79. It is arranged to engage opposite the volume 47, above the protection area 59.

Other finishing parts are also provided to cover especially the ventilation/ de-misting outlets, to trim the underside of the steering column, etc. (see parts 79a, 79b, 79c, 79d, 79e, 79f, 79g, and 81 in FIG. 3).

In the diagrammatic sectional view in FIG. 4, which therefore corresponds to a view in the assembled state of the parts and members in FIGS. 1, 2 and 3, there is found the upper support block 1 surmounting the intermediate block 3 to constitute the two air circulation channels 9–19 and 21–25. just below the support block 3 is the lower support block 7 with its box shape, at the location of the space 49. Inside this space, the presence of the electronic housings 57a, 57b may be noted (interface housing for the heating unit, housing for the safety device in case of impact, housing for the navigation equipment, etc.).

The lower support block 7 is covered at the front by the trim panel 73.

At 51, there is shown diagrammatically the steering column, and at 83, 85 there are respectively indicated the firewall of the vehicle and the floor of the chassis of the same vehicle which is found in FIG. 5, where the firewall 83 extends between the two "A" pillars, 87a, 87b, of the vehicle 10.

In FIG. 4, the set of pedals and its associated devices (cylinder block, etc.) have not been shown in order to make the drawing easier to read.

In this figure there will be noted the arched shape (portion of a cylinder) of the channel portions 9–21 of the block 1 and the shape, which is on the contrary more angular, of the half-channel 19 of the block 3.

The cover 65 covers the two channels, while leaving the location for the air outlets free, such as 27.

In the hollow 37, the presence of the cabling 39 may be noted, located in a sheathing throat 40, which is fixed to the block 1.

In FIG. 4 there will also be noted the presence of the antivibration bar 5 with its horizontal central tray 55a to which the steering column 51 is fixed, by way of the connecting member 89 (shown in FIG. 4).

The lateral upright 55c of the antivibration bar 5 itself is arranged to be fixed to the "A" pillars 87a (FIG. 5), by any appropriate means (lower portion).

In FIG. 6 are to be found the blocks l, 3, 7, with the air channels 9–19 and 21–25, the upper cover 65, the bundle of cables 39, the firewall 83 and the floor 85, in particular.

Facing the passenger compartment 91, there can further be seen the central console 75 and its trim panel 77. The console 75 is fixed to the blocks l and 7. It may also be fixed to the heating and ventilation unit 17.

Since the heating unit is standard, it will not be described. There will simply be noted the air inlet at 93, the upper and lower air outlets, respectively 95 and 97 (air towards feet).

The air outlet 95 communicates with the interface housing 45 of the block 7 which transmits the air towards the channels 9–19 and 21–25.

Usually, the unit 17 comprises a fan 98, an evaporator, etc.

This unit extends, in the present instance, between the lower surface of the block 7 and a local false floor 99 which extends, at the location of the floor tunnel, above the floor 85 (it should be noted that, if necessary, the false floor 99 could be omitted).

The unit 17 is moreover mounted in upper and lower sliding surfaces, 101, 103, linked respectively to the lower face of the block 7 and to the upper face of the false floor 99. The sliding surfaces are oriented parallel to the longitudinal axis "X" of the vehicle, so that the unit 17 can slide in this direction, in particular for its disassembly, if required, from the passenger compartment 91.

Figure 9:
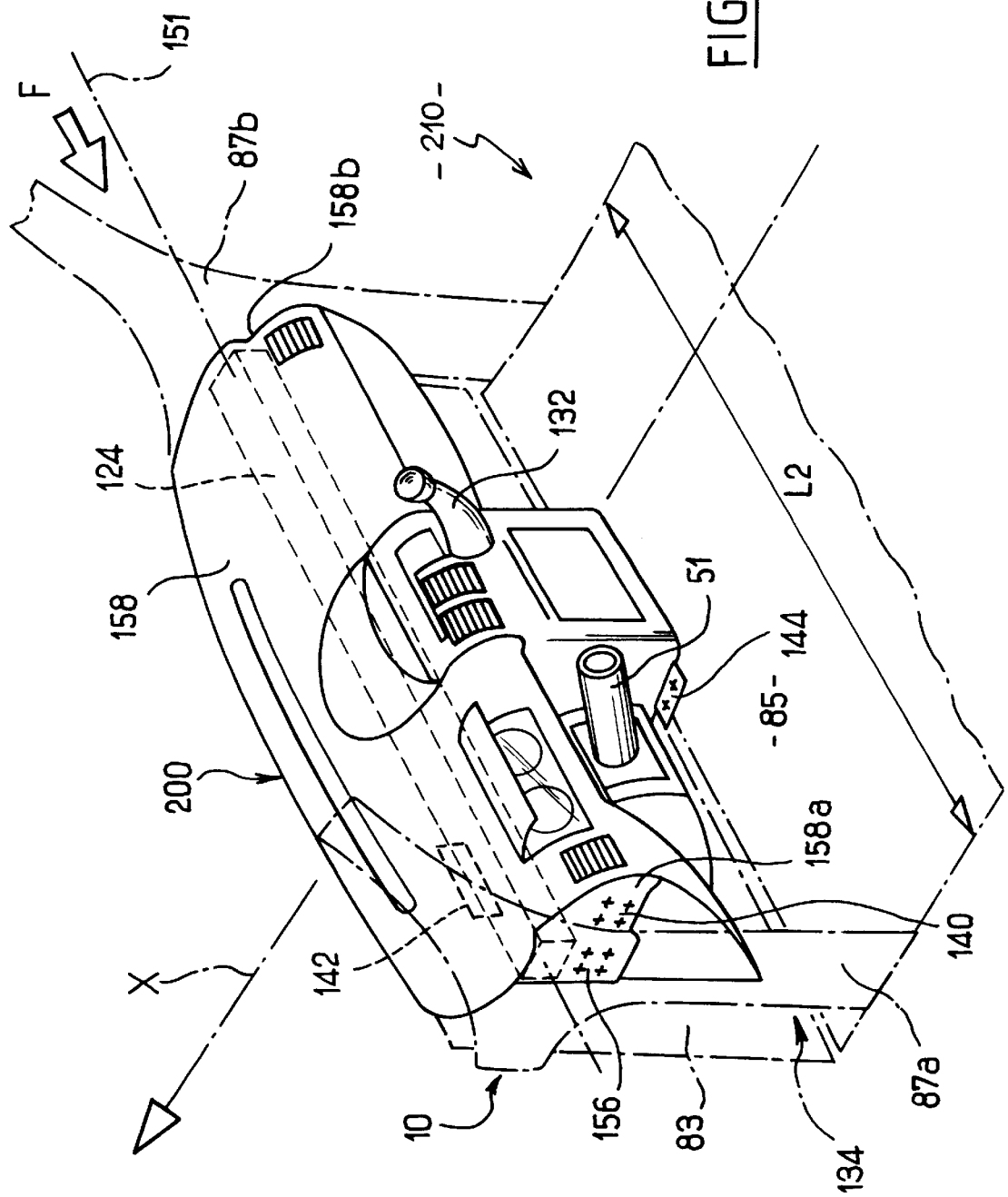

In FIGS. 7, 8 and 9 can be seen another example of an embodiment of a cockpit according to the invention.

Firstly, in FIG. 7, the step of mounting an antivibration structure 110 is shown diagrammatically, including the fixing of a heating and ventilation unit 112 to it.

The antivibration structure 110 comprises a generally plane, substantially horizontal plate 114 and two standing, substantially vertical legs 116, 118. The arrows and the black dots in FIG. 7 show the areas for fixing the legs beneath the plate 114.

Typically, the heating and ventilation unit 112 generates air at a controlled temperature, from a lateral air intake 120, two air outlets 122a, 122b, directing the air towards the air conduit indicated by 124 in FIG. 8, through the openings 126a, 126b provided through the antivibration plate 114, and also 128a, 128b, provided opposite, in the bottom of the conduit 124, so that the air inlets 122a, 122b open out there.

The plate 114 may be metallic (light alloy, etc.) or of plastics material.

Along the longitudinal direction (direction of move "X" of the vehicle), the antivibration plate 114 has a length "L1" extending perpendicularly to the axis "X", and over only a portion of the width "L2" of the vehicle (width measured between the "A" pillars, 87a, 87b —see FIG. 9). It will be noted that the dimensions have not been particularly respected between FIGS. 7, 8 and 9 and that, for example, the gear lever 132 in FIG. 8 will typically be located more clearly towards the driver than it appears to be in FIGS. 8 and 9.

Be that as it may, the antivibration structure 110 is arranged to be fixed at three points of the structure (indicated as a whole by 134 in FIG. 9) of the vehicle. In FIG. 9, only certain portions of the structure have been shown diagrammatically: the floor 85, the "A" pillars 87a, 87b and the firewall 83 (separating wall or armature between the passenger compartment and the engine compartment).

In FIG. 7, the reference numbers 140 and 142 mark two lugs for fixing the antivibration plate 114 to the structure 134 of the vehicle. These two reference numbers will also be found in FIG. 9. These two fixing (or fixation) means make it possible to connect the antivibration plate 114 on the one hand, to the "A" pillar 87a (fixing means 140), and to the firewall 83 (fixing means 142). At least a third fixing means is advised. In the present instance, it is obtained by means of at least one of the two support legs 116, 118, for example by way of the lug 144 of the leg 116, which can be seen in FIG. 9 as being fixed to the floor 85 of the vehicle.

In FIG. 8, the antivibration plate 114 is shown with members already fixed onto it. Thus, the heating and ventilation unit 112 is arranged beneath this plate, between the upright (or standing) legs, 116, 118. Also to be observed are the two air supply conduits 122a, 122b, which pass through the plate 114. The gear lever 132 and its control housing 146 are also fixed beneath the antivibration plate 114, for example by screwing. Closer to the left-hand lateral end of the plate there can also be seen a cradle 148 for holding the steering column 51. The cradle 148 is fixed beneath the plate 114, for example by screwing. Thus, the plate 114 will limit the vibrations in the steering column and in the gear lever which are suspended therein. The "bracket" shape of the plate 114 with the (or the two) support legs(s), is a priori preferred to the portal shape (reference 5 of FIGS. 1 and 2).

Once the aforesaid members have been assembled to the antivibration plate, the latter will be fixed to the structural part (or member)150 in FIG. 8.

Similarly to what has been described in relation to FIG. 1, the part 150 comprises an upper tray 150a and a lower tray 150b each defining locally a half-channel shape and which, once assembled as in FIG. 8, together form an inner air conduit 152 which extends over the entire length "L2" of the part 150, which length corresponds (except for margins) to the width "L2" of the vehicle, between the "A" pillars, 87a, 87b (FIG. 9). The structural part 150 is, mechanically, the key part of the cockpit through which will pass all the force which the cockpit must withstand in the case of impact.

To this end, the conduit 124, which therefore extends generally 20 along the direction 151 (which is perpendicular to the axis "X", once the cockpit is mounted in the vehicle) communicates with the air inlets 128a, 128b, and also with the air outlets 154a, 154b, 154c, 154d.

In order to take up the forces in the case of impact, the structural part 150 is fixed directly to the structure of the vehicle. In the present instance, two lateral lugs (only one is visible in FIG. 8, where it is indicated by 156) effect, at the location of the lateral sides 158a, 158b (FIG. 9), the fixing of the part 150 to the "A" pillars, 87a, 87b.

Before that, the plate 114 will have been fixed beneath the part 150, for example by screwing, having taken care to engage the air supply conduits correctly in the air inlet apertures of the conduit 124.

Then, the outer trim of the cockpit will be fixed, and in particular the cover 158 (FIG. 9) which will have been added over the structural part 150, fixing it there. This trim (in particular the cover 158) is mechanically much less resistant than the part 150.

Concerning the latter, its recommended manufacture as a molded part, essentially of plastics material, is appreciable. The addition of reinforcing fibers (for example, glass fibers) or metallic inserts (hybrid part typically manufactured by overmolding) will provide it with the desired mechanical strength (or resistance).

To test the resistance to force of the cockpit of the invention, and in particular that indicated as a whole by 200 in FIG. 9, the procedure is as follows:

Firstly, the cockpit indicated as a whole by 200 in FIG. 9 is mounted inside the vehicle 210 arranged to receive it (see FIGS. 9 and 10).

Typically, the cockpit 200 according to the invention comprises the parts already mentioned 110, 150, 158 and the different elements which are fixed to them (unit 112, column 51, lever 132, etc.).

The cockpit 200, in the example envisaged, is fixed on either side (axis 151) to the "A" pillars, 87a, 87b, and also to the firewall 83 (fixing means 142).

The vehicle 10 in which the cockpit is mounted is "complete", that is to say, ready for sale and therefore fairly different from what is illustrated very diagrammatically in FIGS. 5 or 10, where only a part of the structure of the vehicle is illustrated diagrammatically.

In other words, the vehicle being tested is a fully equipped "standard" vehicle.

For conducting the tests which are in force, reference will be made to the existing standards which define them, or to the internet site of the Federation Internationale d'Automobile (International Automobile Federation, F.I.A. -Geneva, Switzerland): "http://www.fia.com", heading "tourisme/safet/safint.html" especially, where the impact (or shock) tests in force at the time of filing of the present application are indicated as being of three sorts : frontal impact at 56 km/hour, side impact, at 50 km/hour, and even (also frontal) impact with a pedestrian at 40 km/hour.

In FIG. 9, the arrow "F" parallel to the axis 151 simulates the maximum force of the "test with side impact" that the cockpit 200 should be able to absorb while remaining within predetermined, standardized reaction values. Advantageously, the beam (or hollow cross beam)/conduit 124 of the cockpit should itself comply with the values prescribed by this standard, including within the framework of a simulation which would omit all the other elements of the cockpit and would leave in place only this beam 124. Such a procedure makes it possible, in other words, to discharge the other portions, parts or elements of the cockpit 200 from the role of mechanical resistance to the maximum force induced by the impact tests, it being stated that the frontal impact test represented by the arrows "F1" in FIG. 10 should induce a capacity of resistance similar to capacity of resistance to the maximum forces "F1" Is generated transversely on the beam 124, advantageously considered on its own.

In FIG. 10, the forces "F1" are therefore transmitted to the cockpit 200 (and more particularly to the transverse beam/conduit 124) by way of the side sills 201 and the "A" pillars.

In an interesting embodiment, the maximum force, or each maximum force, which the cockpit should be able to resist (or withstand) within the framework of the tests carried out, may be divided into two parts a first part of forces provided to be absorbed by the cockpit 200, and a second part arranged to be absorbed by the structure of the vehicle ("A" pillars, firewall, door, etc.). In this respect, it is then advised that less than 50% of the maximum force considered should be withstood by the cockpit. 30% (to within 20%) would appear to be an appropriate value. There again, it is preferably the beam/conduit 124 which will have been sized and shaped to be able to withstand, in accordance with a predetermined specification, this part of the maximum force under consideration.

For information, the description will finish with some comments:

The term "plate" indicates, for the parts concerned, that the part is relatively thin (as is the case for the structural part 150 in comparison with the cockpit 200 as a whole). But that does not imply that it is necessarily a plane part (it may be curved, including with an angled shape, for example).

The term "tray" corresponds substantially to the term "plate", while insisting however on the generally plane appearance of the part and on the fact that it basically extends substantially horizontally.

If required, the "bracket" or the "portal" pertaining to the antivibration structure could be in the form of an arch, even if the bracket shape, as in FIG. 8, is preferred a priori.

The "lateral sides" of the cockpit correspond to the sides 158a, 158b of FIG. 9. They are indicated relative to the axis of longitudinal move "X" of the vehicle, such that the cockpit (or the beam/conduit 124) has a main direction transverse to the axis "X".

Concerning the fixing between the cockpit (and in particular the structural part 150) and the structure 134 of the vehicle, the standard types of fixing (screwing, welding, etc.) are permitted. It could also be that fixing is effected not with the "A" pillars but, for example, essentially with the firewall 83. Moreover, the cockpit is indicated as being intended to be positioned "in proximity to the "A" pillars".

It should also be clear that the heating and ventilation unit may be an air-conditioning unit. It is in practice the main block in which are included the radiator, evaporator etc.

The term "sole" applied to the hollow cross beam, such as the beam 124, indicates that it is a unitary assembly, even if the conduit may be divided into several elements or sections, extending if necessary in different planes, or even indifferent directions, the main direction nevertheless remaining generally parallel to or coinciding with the axis 151.

Moreover, when it is indicated that "the beam is adapted to substantially withstand all the maximum force the cockpit must withstand", the beam/conduit in question is allowed a margin of around 10%.

What is claimed is:

1. A cockpit for an automotive vehicle comprising a structural body including a floor and "A" pillars; the cockpit having a main direction, a length and two lateral sides, the main direction crossing the two lateral sides of the cockpit which are adapted to be located near the "A" pillars of the vehicle, the cockpit being adapted to withstand a determined maximum force, the cockpit comprising:

fixation means for fixing the cockpit to the structural body of the vehicle and for transferring from one to another, eatt least a part of said determined maximum force, and transversal reinforcing means extending substantially along said main direction and comprising one hollow cross beam which extends substantially along the main direction on at least a main portion of said length and which defines an air duct, said air duct being connected to input means for air and to output means for air; said one hollow cross beam having a mechanical resistance sufficient for withstanding substantially said determined maximum force, wherein the cockpit further comprises an antivibration structure which is connected to the structural member and which comprises a bracket to which is connected one of a steering column and a gear lever, for absorbing vibrations transmitted in said one of the steering column and the gear lever; the antivibration structure comprising at least two fixation areas located apart from each other for defining two connections with the structural body of the vehicle.

2. The cockpit according to claim 1, wherein said one hollow cross beam and the input means for air and the output means for air are integrated to a molded structural member which is essentially made of plastic material, substantially plate-shaped and provided with at least some of the fixation means; the molded structural member being covered with a decorative covering connected thereto, the decorative covering being less mechanically shockproof than the structural member.

3. The cockpit according to claim 2, wherein the structural member comprises:

a first plate extending substantially in a horizontal plane and having a length along said main direction, the first plate integrating a first upper portion of the air duct, open downwards and extending substantially along the main direction, a second plate extending substantially in a horizontal plane and having a length along the main direction, the second plate integrating a second lower portion of the air duct, open upwards, and extending substantially along the main direction, the first and second plates being connected together for defining said air duct.

4. The cockpit according to claim 1 wherein the antivibration structure comprises:

one of an antivibration plate and a bar, extending substantially along the main direction, in a lower area of the cockpit, and to which is connected one of the steering column and the gear lever, and at least one stem standing under the structure, the stem being connected to connection means for connecting the stem to the floor of the vehicle, in order to transmit said vibrations towards the floor.

5. The cockpit according to claim 1, wherein the antivibration structure extends from the lateral side of the cockpit which is closer to the steering column to beyond a location area of said steering column, but only on a portion of the length of the cockpit.

6. The cockpit according to claim 1, wherein the cockpit is connected to a heating and ventilating unit, through the antivibration structure, the heating and ventilating unit extending under the antivibration structure and being adapted for generating air at a regulated temperature to the input means for air of said air duct.

7. The cockpit according to claim 1, wherein the antivibration structure comprises an antivibration plate extending substantially in an horizontal plane and having a length along said general direction, the antivibration plate being located under the structural member and being connected thereto, as well as to a substantially vertical force strut, at some distance from the lateral sides of the cockpit.

8. The cockpit according to claim 6, wherein the cockpit further comprises sliding means for slidably connecting the heating and ventilating unit to the cockpit.

9. An automotive vehicle having a longitudinal direction, two lateral sides extending substantially parallel to said longitudinal direction, and comprising:

a structural body including "A" pillars, a dashboard having a main direction and a length along said main direction, the main direction extending substantially perpendicular to the longitudinal direction of the vehicle and crossing two lateral sides of the dashboard which are adapted to be located near the "A" pillars of the vehicle, the dashboard being adapted to withstand a determined maximum force, the dashboard comprising:

fixation means for fixing the dashboard to the structural body of the vehicle and for transferring from one to another at least a part of said determined maximum force, transversal reinforcing means extending substantially along said main direction and comprising one hollow cross beam extending substantially in said main direction, on at least a main portion of said length, the hollow cross beam defining an air duct and being therefore connected to input means for air and to output means for air, the vehicle being designed for withstanding a determined front shock punched along substantially the longitudinal direction of the vehicle and which is transmitted to the dashboard through the structural body of said vehicle, and said determined maximum force being less than substantially 50% of a force induced by the front shock, a remaining part of said force being essentially withstood by the structural body of the vehicle, wherein the automotive vehicle further comprises an antivibration structure which is connected to the structural member and which comprises a bracket to which is connected one of a steering column and a gear lever, for absorbing vibrations transmitted in said one of the steering column and the gear lever; the antivibration structure comprising at least two fixation areas located apart from each other for defining two connections with the structural body of the vehicle.

10. The vehicle according to claim 9:

wherein the hollow cross beam, the input means for air and the output means for air are integrated to a molded structural member which is essentially made of plastic material and is substantially plate-shaped, the molded structural member being provided with at least some of said fixation means, the molded structural member being covered with a decorative covering connected to said molded structural member and which is less shockproof than the molded structural member, and wherein the fixation means of the dashboard are transmitting said determined maximum force from the structural body of the vehicle to said dashboard in such a way that substantially all the determined maximum force is transmitted to the hollow cross beam, said hollow cross beam continuously extending a length of the dashboard and having a mechanical resistance sufficient for withstanding said determined maximum force, without breaking.

* * * * *